June 2, 1959     J. W. SCOTT, JR     2,889,287
CATALYST AND METHOD OF CATALYST PREPARATION
Filed Aug. 12, 1955
HYDROCRACKING CATALYST
FEED: HEAVY CALIFORNIA GAS OIL, GRAV. = 20.6° API
CONDITIONS: 850°F., 800 PSIG, 4000 SCF/B
GAS RECYCLE, 2 LHSV
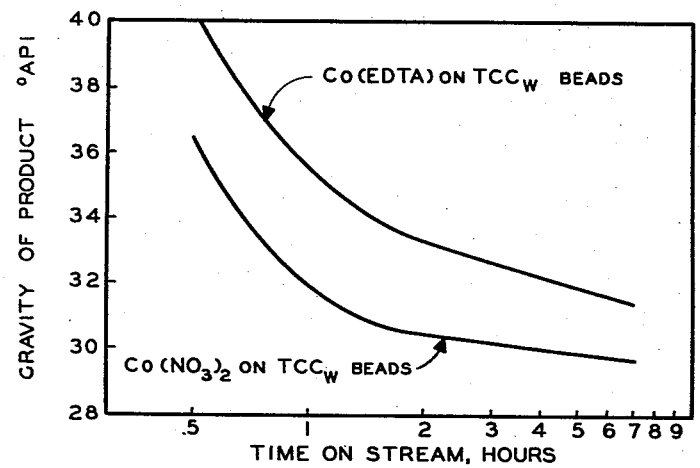
FIG. I
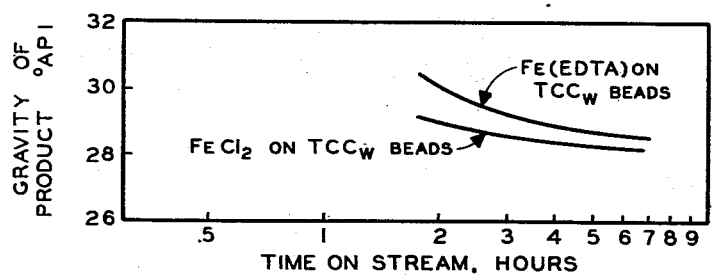
FIG. II
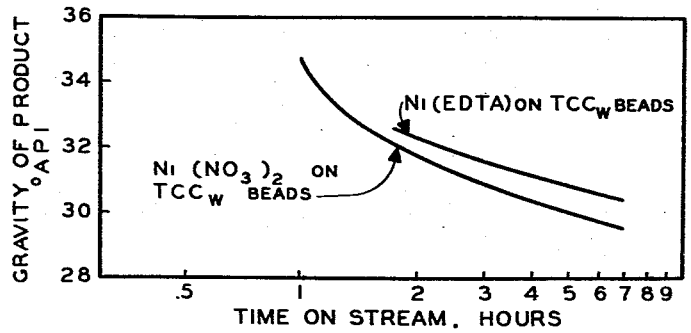
FIG. III
INVENTOR
*JOHN W. SCOTT, JR.*
BY
ATTORNEYS

2,889,287

CATALYST AND METHOD OF CATALYST PREPARATION

John W. Scott, Jr., Ross, Calif., assignor to California Research Corporation, San Francisco, Calif., a corporation of Delaware Application August 12, 1955, Serial No. 527,903

9 Claims. (Cl. 252—455)

This invention relates to improved catalysts comprised of catalytically active metal materials, such as metals or metal compounds, dispersed or distributed uniformly on the surface of porous support materials and to methods of preparing such catalysts. This application is a continuation-in-part of Serial No. 460,135, filed October 4, 1954, and now abandoned.

A wide variety of reactions catalyzed by metals or metal compounds is well known in the art. Since such catalysis is known to be primarly a surface phenomenon, it is generally the practice to employ the catalysts in a form in which the catalytically active material is dispersed or distributed on a suitable high surface carrier or support, which may or may not itself have catalytic properties. In this manner, it is possible to procure the catalyst in a form which is stable and which has a relatively large active surface area per unit weight of catalytically active material. Although the catalytically active metal or metal compound may be dispersed or distributed over the surface of the porous support or carrier in various ways, dispersal is most commonly accomplished by impregnating the support or carrier with a suitable soluble compound of the metal and then drying and calcining the composite so as to convert the compound to the desired catalytic metal or metal oxide. The oxide may then, if desired, be converted to different catalytically active compounds by suitable known treatment, i.e., hydrogenation, halogenation, sulfurization, etc. Modifications of this impregnating procedure include precipitating the hydrous oxides of the catalytic agent in the presence of a wet carrier gel or coprecipitating the hydrous oxides of the catalytic agent and the carrier gel.

Although these procedures produce a fairly even deposition of the catalytically active material over the surface of the porous support or carrier, it is still found that the ultimate dried deposit of the catalytically active material upon the carrier or support is in the form of rather large crystals or crystallites. Upon examination of the catalyst, evidence of this crystalline form is readily obtained in the form of X-ray crystalline diffraction pattern lines. Procedures of catalyst preparation heretofore known in the art have succeeded only in retarding this crystallization to the extent that the crystals formed are not so large as to excessively hinder or prevent penetration of the interior pores of the finished catalyst by the feed undergoing catalytic conversion.

It is apparent that all atoms of the catalytically active material which comprise the interior of such crystals or crystallites are unavailable for catalytic activity. Furthermore, it appears that the rather large crystals or crystallites resulting from the procedures heretofore known and used are formed or have their origin during drying by migrating atoms of the catalytically active material with the result that exposed areas of the support material are left between the crystals or crystallites. The net result is that such crystallization is wasteful of the catalytic agent and materially decreases the realizable effective catalytic surface.

A further disadvantage of the methods of impregnation heretofore employed is that catalysts containing two or more metals must frequently be prepared stepwise, impregnating, drying and calcining the support first wtih one metal and then with another, because of the chemical incompatibility in solution of the two or more impregnating compounds. This gives a catalyst of inferior activity compared to one wherein several metals are introduced simultaneously in accordance with this invention.

It is an object of the invention to produce catalysts wherein the active catalytic metal material is dispersed uniformly over the surface of the carrier or support without substantial formation of large crystallites of the catalytically active metal material and which exhibit considerably enhanced catalytic activity and useful life as compared to catalysts containing the same or greater amounts of catalytically active metal material, but which have been prepared by previously known methods.

It is another object of the invention to provide a method whereby a porous carrier or support can be impregnated with two or more catalytically active metals simultaneously in cases where simultaneous impregnation has not been possible in the past because of the inability to retain the different metals or metal compounds in the same solvent without the formation of a precipitate. A further object is to introduce said different metals simultaneously in such form as to achieve greatly improved activity compared to that possible via conventional preparations.

The foregoing objects are attained pursuant to the invention by wetting a catalyst support with a dispersion of a metal chelate, comprising an amino acid as the chelating agent, in a liquid carrier and heating the wetted support to evaporate the liquid carrier and to decompose the amino acid.

It has now been found that catalysts having substantially enhanced activity may be produced if the catalytically active metal is converted to a metal chelate compound using an organic amino acid as the chelating agent and the catalyst support is impregnated with the chelate compound. In such a metal chelate, the amino acid by means of two or more valences, principal or residual, or both, attaches itself to the metallic ion to form a heterocyclic ring. Since both the amino and carboxyl groups are highly active chelate donor groups, the amino acid chelates are among the most stable chelates known. The rings formed are particularly stable when the number of constituent atoms is in the range from 5 to 8; hence, alpha-, beta-, gamma- and delta-amino acids are preferred for use in this invention.

The metal-amino acid chelate compounds employed pursuant to the invention can be advantageously formed using amino acids of relatively low molecular weights, the chelates of which are soluble in water or other solvents. Amino acid chelates and chelate salts which are water-soluble are especially preferred, since the water solvent need not be collected as the impregnated support is dried. Also, clustering of chelated molecules is minimized when the chelate compound can exist in the form of ions in an aqueous solution. Metal-amino acid chelates soluble in the desired extent in water or polar organic solvents are best prepared if the amino acid contains no more than 20 carbon atoms, and representative amino acids coming within this preferred category are ethylenediamine tetraacetic acid (EDTA), N-2-hydroxyethyl ethylenediamine triacetic acid (EDTA—OH), aspartic acid, glutamic acid, tryptophan, valine, phenylalanine, alphaalanine, beta-alanine and asparagine. A still more preferred class of compounds for use in the present invention is made up of polycarboxylic amino acids such as EDTA, EDTA—OH, glutamic acid and aspartic acid. When compounds of the latter type are employed, it is possible to prepare a metal chelate compound having replaceable hydrogen atoms, and it is then possible to synthesize metallic salts of such acid chelates which contain either the same metal or a different metal than the cation. Such salts provide an excellent means of impregnating a support material with two or more metals simultaneously. The use of such salts is especially advantageous in those cases where it is desired to impregnate two or more metals whose compounds react in conventional impregnating solutions to form insoluble precipitates. Impregnation of two or more metals is also performed according to the invention by forming chelate compounds of each metal.

Those metals of groups II to VIII, inclusive, of the periodic table which are capable of chelation, or which can form salts of chelates as later disclosed, can be efficiently dispersed on a catalyst support pursuant to the invention. The process is especially valuable in preparing supported catalysts containing metals of groups VI and VIII, not only because of enhanced catalytic activity, but because smaller amounts of these rather expensive materials can be so advantageously disposed on the carrier that a catalytic effect equal to that of conventionally prepared catalysts having much higher contents of active catalytic material is obtained. Particularly good results have been obtained with chelates of the metals platinum, nickel, cobalt, molybdenum and chromium, either alone, or in the form of chelate salts wherein two of such metals are present, e.g., molybdenum and cobalt, cobalt and chromium, zinc and chromium, or nickel and chromium.

The metal-amino acid chelates are stable and the vapor pressure of the chelated amino acid is low; as a result, the metal chelate compound remains intact during the drying of the impregnated support. Since the catalyst produced by the method of this invention shows no formation of crystals or crystallites of the catalytically active metal material, it is believed that the metal atoms, sterically shrouded by the atoms of the chelating agent, have little or no tendency to migrate and form crystals during the drying of the solvent from the impregnated support. The resultant enhanced activity of the catalyst may then be explained by a decrease in, or absence of, exposed areas of the support as a result of suppressing the migration of the catalytically active atoms during drying.

In the preparation of the catalysts of the invention, a dispersion of the metal-chelate compound in a suitable solvent (the term dispersion as employed herein also including those systems wherein the chelate is present in solution) is generally contacted with a previously dried support. However, it may also be contacted with a wet or freshly precipitated carrier gel to accomplish the desired impregnation. After impregnation, the carrier or support is dried to remove the solvent. The metal-chelate compound remains intact during the drying and is thereafter decomposed to the metal or metal oxide by calcining. The oxide may be converted to different catalytically active metal compounds, if desired, by conventional chemical treatment, such as to the reduced metals, the sulfides, the halides, etc. The metal-chelate which is deposited on the dried support can also be converted directly to the metal by destructive hydrogenation of the chelated amino acid. The catalyst support employed in connection with the chelate can be selected from a wide variety of porous materials of high surface area such as alumina, the various silica-aluminas, clays and the like. Such supports may be either substantially inert or they may possess catalytic activity; however, any material employed should have a surface area of at least about 25 m.²/gram. Particularly good results have been obtained when using a support having inherent catalytic cracking activity as, for example, synthetically prepared silica-aluminas containing 75% or more or silica, as well as various silica-magnesia, silica-alumina-zirconia, and clay products.

The following examples, taken in conjunction with the figure of the appended drawings, which are graphical comparisons of the useful life and activity of catalysts prepared pursuant to the invention with catalysts of identical composition prepared in a conventional manner, as explained below, are believed to illustrate the invention in various of its embodiments.

EXAMPLE I

A cobalt molybdenum catalyst is prepared in accordance with the present invention by the following procedure. To one molar part of ethylenediamine tetraacetic acid slurried in water are added two parts of ammonium hydroxide. Then one molar part of cobaltous hydroxide or cobaltous carbonate is added and the solution warmed gently to speed the chelation reaction. If desired, this solution can be concentrated to obtain a salt of the formula: $(NH_4)_2(CoY) \cdot 4H_2O$, wherein the symbol Y is used to designate the completely ionized form of ethylenediamine tetraacetic acid with the structural formula shown below:

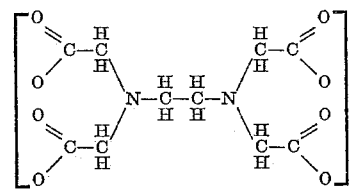

TCC white beads, a commercial silica-alumina cracking catalyst containing 10% by weight of alumina, 8 to 14 mesh, are used for a support and the pore volume is determined by water absorption measurements. The cobalt chelate solution concentration is adjusted so that the volume of chelate solution to be absorbed by the support material (i.e., the pore volume of the support) contains a quantity of dissolved cobalt metal equal to 0.5% of the finished catalyst by weight. Sufficient $$(NH_4)_6Mo_7O_{24} \cdot 4H_2$$

is then dissolved in the cobalt chelate solution so that the volume of solution to be absorbed by the support material contains a quantity of dissolved molybdenum metal equal to 2% of the finished catalyst by weight. Since the cobalt has been prepared as a chelate compound, it is not necessary to add $NH_4OH$ in high excess, as is required to maintain cobalt and molybdenum in the conventional impregnating solution where the cobalt is not chelated.

The support is covered with the cobalt molybdenum solution and allowed to stand 24 hours to assure thorough impregnation. The support material is removed from the solution and kept at 250° F. until dry. It is then calcined for two hours at 830° F., two hours at 930° F. and 12 hours at 1030° F.

The cracking yield from heavy California gas oil produced by a catalyst prepared in the above manner is shown in Table I.

Table I

[Run conditions: 850° F., 800 p.s.i.g., 2 v./v./hr., 4000 s.c.f./b. gas recycle. Gravity of feed: 20.6° A.P.I.]

| Catalyst | Yields, Volume Percent | | | | Gasoline $C_5$—410° F. | | |
|---|---|---|---|---|---|---|---|
| | $C_3$—and $H_2S$, Wt. Percent | $C_4$ | $C_5$—410° F. | 410° F.+ | Grav., °A.P.I. | 50% Pt., °F. | Octane |
| 0.5% Co(EDTA)[1] and 2% Mo | 3.1 | 2.4 | 24.5 | 77.7 | 53.6 | 287 | 68.8 |

[1] EDTA—Ethylenediamine tetraacetic acid.

EXAMPLE II

A cobalt molybdenum catalyst is prepared in accordance with the invention by the following procedure. A solution of the salt $(NH_4)_2Co(Y)\cdot 4H_2O$ is prepared according to the method of Example I.

8–14 mesh alumina is used for a support and the pore volume is determined by water adsorption measurements. One molar part of molybdenum trioxide is dissolved in an aqueous solution containing one molar part of oxalic acid and the concentration is then adjusted so that the volume of oxalato molybdic acid solution absorbed contains a quantity of dissolved molybdenum metal equal to 7.3% of the finished catalyst by weight. The support is covered with the oxalato molybdic acid solution and allowed to stand 24 hours to assure thorough impregnation. The support material is removed from the solution and kept at 250° F. until dry. It is then calcined for two hours at 830° F., two hours at 930° F. and 12 hours at 1030° F.

The molybdenum-containing support so prepared is then immersed in a solution of the cobalt chelate wherein the concentration has been adjusted so that the volume of chelate solution to be absorbed by the support material contains a quantity of dissolved cobalt metal equal to 2% of the finished catalyst by weight. The support is covered with the cobalt chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

The cracking yield from heavy California gas oil produced by a catalyst prepared in the above manner is shown in Table II:

Table II

[Run conditions: 850° F., 800 p.s.i.g., 2 v./v./hr., 4000 s.c.f./b. gas recycle (90% $H_2$). Gravity of feed=20.6° A.P.I.]

| Catalyst | Yields, Volume Percent | | | | Gasoline $C_5$—410° F. | | |
|---|---|---|---|---|---|---|---|
| | $C_3$—$H_2S$, Wt. Percent | $C_4$ | $C_5$—410° F. | 410° F.+ | Grav., °API | 50Pt., °F. | Octane |
| 2.0% Co(EDTA) and 7.3% Mo | 4.4 | 2.5 | 31.6 | 70.5 | 54.0 | 285 | 60.2 |

EXAMPLE III

A cobalt molybdenum catalyst is prepared in accordance with the invention by the following procedure. The salt $(NH_4)_2Co(Y)\cdot 4H_2O$ is prepared according to the method of Example I.

TCC white beads, a commercial silica-alumina cracking catalyst containing 10% by weight alumina, 8–14 mesh, are used for a support and the pore volume is determined. The cobalt chelate solution concentration is then adjusted so that the volume of chelate solution to be absorbed by the support material contains a quantity of dissolved cobalt metal equal to 1.15% of the finished catalyst by weight. $(NH_4)_6Mo_7O_{24}\cdot 4H_2O$ is then dissolved in water which is 1–2 molar in ammonium hydroxide, which is necessary to its solution. Sufficient cobalt chelate and water are added so that the volume of solution to be absorbed by the support material contains a quantity of dissolved molybdenum metal equal to 3.65%, and a quantity of cobalt metal equal to 1.15%, of the finished catalyst by weight.

The support is covered with the cobalt molybdenum solution and allowed to stand 24 hours to assure thorough impregnation. The support material is removed from the solution and kept at 250° F. until dry. It is then calcined for two hours at 830° F., two hours at 930° F. and 12 hours at 1030° F.

The calcined support is again immersed in the cobalt molybdenum solution, allowed to stand 24 hours, dried and calcined, as described above. This produces a catalyst containing 2.3% cobalt and 7.3% molybdenum by weight.

The cracking yield from heavy California gas oil produced by a catalyst prepared in the above manner is shown in Table III:

Table III

[Run conditions: 850° F., 800 p.s.i.g., 2 v./v./hr., 4000 s.c.f./b. gas recycle. Gravity of feed=20.6° A.P.I.]

| Catalyst | Yields, Volume Percent | | | | Gasoline | | |
|---|---|---|---|---|---|---|---|
| | $C_3$—$H_2S$, Wt. Percent | $C_4$ | $C_5$—410° F. | 410° F.+ | Grav., °API | 50Pt., °F. | Octane |
| 2.3% Co(EDTA) and 7.3% a Mo | 3.0 | 2.0 | 22.0 | 79.6 | 52.8 | 307 | 64.6 |

EXAMPLE IV

A cobalt catalyst is prepared in accordance with the invention by the following procedure. A solution of the salt $(NH_4)_2Co(Y)\cdot 4H_2O$ is prepared according to the method of Example I. TCC white beads, 8–14 mesh, are used for the support material and the pore volume is determined by water absorption measurements. The cobalt chelate solution concentration is then adjusted so that the volume of chelate solution to be absorbed by the support material contains a quantity of dissolved cobalt metal equal to 2% of the finished catalyst by weight.

The support is covered with the cobalt chelate solution and allowed to stand 24 hours to assure thorough impregnation. The support material is removed from the solution and kept at 250° F. until dry. It is then calcined for two hours at 830° F., two hours at 930° F. and 12 hours at 1030° F. For the sake of comparison, a catalyst containing 2% cobalt by weight, which is likewise dispersed on TCC white beads, 8 to 14 mesh, is also prepared by soaking the beads in a solution of $Co(NO_3)_2$, wherein the cobalt concentration has been adjusted so that the volume of cobalt nitrate solution to be absorbed by the support material contains a quantity of dissolved cobalt metal equal to 2% of the finished catalyst by weight. The support is covered with the cobalt nitrate solution and allowed to stand 24 hours to assure thorough impregnation. The support material is removed from the solution and kept at 250° F. until dry. It is then calcined for two hours at 830° F., two hours at 930° F. and 12 hours at 1030° F.

In Fig. 1 of the drawing the preferred product of higher A.P.I. gravity obtained by use of the cobalt chelate catalyst in cracking heavy California gas oil is contrasted with the product obtained from a similar use of the conventional catalyst prepared from $Co(NO_3)_2$. Since the useful life of the catalyst terminates when the A.P.I. gravity of the product material reaches the acceptable minimum, it can be seen that the higher initial A.P.I. gravity of the product produced by the chelate catalyst results in a significantly longer useful life for catalysts prepared in accordance with this invention.

EXAMPLE V

A cobalt catalyst is prepared in accordance with the present invention by the following procedure. To two molar parts of aspartic acid slurried in water is added one molar part of cobaltous hydroxide or cobaltous carbonate. The solution is warmed gently to speed completion of the chelation reaction.

TCC white beads, 8–14 mesh, are used for the support material and the pore volume is determined. The cobalt chelate solution concentration is then adjusted so that the volume of chelate solution to be absorbed by the support material contains the desired quantity of dissolved cobalt metal, by repeated impregnations if necessary in a particular instance. The support is covered with the cobalt chelate solution and allowed to stand 24 hours at 140° F. to assure thorough impregnation. The support material is removed from the solution and kept at 250° F. until dry. It is then calcined for two hours at 930° F. and 12 hours at 1030° F.

EXAMPLE VI

A cobalt catalyst is prepared in accordance with the present invention by the following procedure. To two molar parts of glutamic acid in aqueous solution is added one molar part of cobaltous hydroxide or cobaltous carbonate. The solution is warmed gently to speed completion of the chelation reaction.

A catalyst having a 2% cobalt content was prepared as in Example V by impregnating silica-alumina with the chelate solution, drying and calcining.

EXAMPLE VII

A cobalt catalyst is prepared in accordance with the present invention by the following procedure. To two molar parts of tryptophan in aqueous solution at a temperature of 180° F. is added one molar part of cobaltous hydroxide or cobaltous carbonate. The solution is warmed gently to speed completion of the chelation reaction.

A catalyst was prepared as in Example V by impregnating silica-alumina with the chelate solution, drying and calcining.

EXAMPLE VIII

An iron catalyst is prepared in accordance with the invention by the following procedure. An iron chelate solution is prepared by adding 6 molar parts of $NH_4OH$ to two molar parts of ethylenediamine tetraacetic acid in aqueous solution. One molar part of $Fe_2(SO_4)_3$ is then added, forming a precipitate of slightly soluble HFeY. The HFeY is separated, washed free of sulfate, and dissolved in one molar part of $NH_4OH$.

TCC white beads, 8–14 mesh, are used for a support material and the pore volume is determined. The iron chelate solution concentration is then adjusted so that the volume of chelate solution to be absorbed by the support material contains a quantity of dissolved iron metal equal to 2% of the finished catalyst by weight. The support is covered with the iron chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

For the sake of comparison, a catalyst containing 2% iron by weight dispersed on TCC white beads, 8–14 mesh, is also prepared by soaking the beads in a solution of ferrous chloride wherein the iron metal concentration has been adjusted so that the volume of solution to be absorbed by the support material contains a quantity of dissolved iron metal equal to 2% of the finished catalyst by weight. The support material is covered with the ferrous chloride solution and allowed to stand 24 hours to assure thorough impregnation. The support material is removed from the solution, dried and calcined, as described above.

In Fig. 2 of the drawing, the preferred product of higher A.P.I. gravity obtained by use of the iron chelate catalyst in cracking heavy California gas oil is contrasted with the product obtained from the use of the catalyst prepared from ferrous chloride.

EXAMPLE IX

An iron catalyst is prepared in accordance with the present invention by the following procedure. To two molar parts of valine in aqueous solution is added one molar part of ferrous hydroxide or ferrous carbonate. The solution is warmed gently to speed completion of the chelation reaction.

TCC white beads, 8–14 mesh, are used for the support material and the pore volume is determined. The iron chelate solution concentration is then adjusted so that the volume of chelate solution to be absorbed by the support material contains the desired quantity of dissolved iron metal to be distributed within the support. The support is covered with the iron chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

EXAMPLE X

An iron catalyst is prepared in accordance with the present invention by the following procedure. To two molar parts of phenylalanine slurried in water is added one molar part of ferrous hydroxide or ferrous carbonate. The solution is warmed gently to speed completion of the chelation reaction.

A catalyst was prepared as in Example IX by impregnating silica-alumina with the chelate solution, drying and calcining.

EXAMPLE XI

A nickel catalyst is prepared in accordance with the present invention by the following procedure. To one molar part of ethylenediamine tetraacetic acid in aqueous solution are added two parts of ammonium hydroxide.

Then one part of nickelous carbonate is added and the solution heated gently to speed the chelation reaction.

TCC white beads, 8–14 mesh, are used for the support material and the pore volume is determined. The nickel chelate solution concentration is then adjusted so that the volume of chelate solution to be absorbed by the support material contains a quantity of dissolved nickel metal equal to 2% of the finished catalyst by weight. The support is covered with the nickel chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

For the sake of comparison, a catalyst containing 2% nickel is also prepared by impregnating TCC white beads with a solution of nickelous nitrate which has been adjusted so that the volume of solution to be absorbed by the support material contains a quantity of dissolved nickel metal equal to 2% of the finished catalyst by weight. The support material is covered with the nickel solution and allowed to stand 24 hours to assure thorough impregnation. The support material is removed from the solution, dried and calcined, as described above.

In Fig. 3 of the drawing the preferred product of higher A.P.I. gravity obtained by use of the nickel chelate catalyst in cracking heavy California gas oil is contrasted with the product obtained from the use of the catalyst prepared from nickelous nitrate.

EXAMPLE XII

A nickel catalyst is prepared in accordance with the present invention by the following procedure. To two molar parts of alpha-alanine in aqueous solution is added one molar part of nickelous hydroxide or nickelous carbonate. The solution is warmed gently to speed completion of the chelation reaction.

A catalyst is prepared as in Example XI by impregnating silica-alumina with the chelate solution, drying and calcining.

EXAMPLE XIII

A nickel catalyst is prepared in accordance with the present invention by the following procedure. To two molar parts of beta-alanine in aqueous solution is added one molar part of nickelous hydroxide or nickelous carbonate. The solution is warmed gently to speed completion of the chelation reaction.

A catalyst is prepared as in Example XI by impregnating silica-alumina with the chelate solution, drying and calcining.

EXAMPLE XIV

A platinum catalyst is prepared in accordance with the present invention by the following procedure. An aqueous solution containing on molar part of commercial $H_2PtCl_6 \cdot 6H_2O$ and an aqueous solution containing one molar part of $K_2CO_3$ are slowly mixed. The resultant precipitate of sparingly soluble $K_2PtCl_6$ is separated and added to an aqueous suspension containing one molar part of $BaSO_3$. The solution is then heated, reducing the $K_2PtCl_6$ to form $K_2PtCl_4$ and giving a $BaSO_4$ precipitate which is removed by filtration. During the reduction, the solution is maintained at a pH of five by the addition of aqueous $K_2CO_3$. Care must be taken that the addition of the $K_2CO_3$ does not produce local areas of pH greater than 6; above pH equal to 6, Pt will be slowly lost as $Pt(OH)_2$. One molar part of ethylenediamine tetraacetic acid is then added to one molar part of $K_2PtCl_4$ in aqueous solution at 180° F. to form $K_2H_2PtYCl_2$. The solution is again neutralized with aqueous $K_2CO_3$ to a pH of five, observing the precautions described above. The completion of the chelation reaction can be followed visually as the red $K_2PtCl_4$ is converted to the yellow $K_4PtYCl_2$. The solution temperature is then lowered to 120° to 130° F. and the solution is concentrated until KCl begins to precipitate. The solution is then cooled and an excess of 12 normal $H_2SO_4$ is added to give $H_4PtYCl_2$. The solution is evaporated to dryness at 120 to 130° F. and the $H_4PtYCl_2$ is extracted from the resultant residue with acetone. If desired, the slightly soluble $H_4PtYCl_2$ can be purified after evaporation of the acetone by washing with water at 0° C.

An alumina support was impregnated with a solution of this chelate in ammonium hydroxide at a pH of about 9.4, in order to achieve even penetration, following which the impregnated alumina was dried and calcined at 800° F. to produce an active platinum catalyst having a platinum content of 0.5% by weight. As an alternative, the compound may be decomposed by reduction in hydrogen, with evolution of ammonia and other decomposition products during the activation.

EXAMPLE XV

In this operation the platinum chelate ($H_4PtYCl_2$) prepared in the manner described in Example XIV is treated to remove the chlorine atoms contained therein before being deposited on a silica-alumina support. The two chloride atoms are removed from the $H_4PtYCl_2$ in the following manner. To two molar parts of aqueous $H_4PtYCl_2$ are added four molar parts of $Ba(OH)_2$, thereby substituting barium for the replaceable hydrogen atoms. To the resulting solution at 32° F. are added two molar parts of $Ag_2O$, thereby replacing the chloride atoms with hydroxyl groups and precipitating all chloride as AgCl. The AgCl is removed by filtration. To the resulting solution of $Ba_2(PtY)(OH)_2$ are added four molar parts of $H_2SO_4$, thereby precipitating barium as $BaSO_4$ and leaving a remaining aqueous solution of dihydrogen ethylenediamine tetraacetoplatinite having the formula $H_2PtY$. The best results are obtained if the neutralization is done promptly. After two molar parts of $H_2SO_4$ have been added, the solution may be safely heated to 212° F. while the remainder of the $H_2SO_4$ is added. This temperature elevation produces a $BaSO_4$ precipitate that is easily removed from the solution by filtration. Analysis of the solid obtained by evaporation of water from the aqueous solution is as follows:

|  | Calculated, percent | Experimental, percent |
|---|---|---|
| Platinum | 35.02 | 34.98 |
| Carbon | 21.54 | 21.31 |
| Hydrogen | 3.98 | 3.86 |
| Oxygen | 34.44 | 34.75 |
| Nitrogen | 5.02 | 5.10 |
| Halogen | 0.00 | Less than 0.01 |

This assay is in accord with the formula $H_2PtY \cdot 4H_2O$.

A solution of the ammonium salt of the compound $H_2PtY \cdot 4H_2O$, as prepared above, was obtained by dissolving the compound in an aqueous solution of ammonium hydroxide. The catalyst was then prepared by impregnating a silica-alumina support (TCC beads) with the ammoniacal solution, following which the impregnated support was dried and calcined at 750° F., thereby converting the chelate to metallic platinum.

EXAMPLE XVI

A catalyst containing the metals cobalt and chromium is prepared in accordance with this invention by the following procedure. Six molar parts of $NH_4OH$ are added to two molar parts of ethylenediamine tetraacetic acid in aqueous suspension. One molar part of $Cr_2(SO_4)_3$ in aqueous solution is then added, forming a precipitate of slightly soluble $HCrY \cdot H_2O$. The $HCrY \cdot H_2O$ can be purified if desired by recrystallizing from boiling $H_2O$.

Cobalt ethylenediamine tetraaceto chromate is prepared by neutralizing one molar part of the acidic chromic chelate with two molar parts of $Co(OH)_2$ or $CoCO_3$. TCC white beads are used for the support material and the pore volume is determined by water absorption measurements. The solution containing cobalt ethylenediamine tetraaceto chromate is then adjusted so that the volume of solution to be absorbed by the support material contains a quantity of dissolved cobalt and chromium metal equal to 2% of the finished catalyst by weight.

The support is covered with the chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

EXAMPLE XVII

A catalyst containing the metals zinc and chromium is prepared in accordance with this invention by the following procedure. $HCrY \cdot H_2O$ is prepared according to Example XV.

Zinc ethylenediamine tetraaceto chromate is prepared by neutralizing two molar parts of the acidic chromic chelate with one molar part of $ZnCO_3$.

The chelated solution containing both zinc and chromium is adjusted so that the volume of chelate solution to be absorbed by the support material contains a quantity of dissolved zinc and chromium metal concentration equal to 2% of the catalyst by weight. A catalyst is then prepared as in Example XV by impregnating silica-alumina with the chelate solution, drying and calcining.

EXAMPLE XVIII

A catalyst containing the metals cobalt and nickel is prepared in accordance with this invention by the following procedure. To one molar part $H_4Y$ is added one molar part $NiCo_3$. The solution is heated gently at a temperature less than 212° F. to speed the chelation reaction. A cobalt salt of the $H_2NiY$ so produced is then prepared by neutralizing one molar part of the acidic nickel chelate solution with one molar part of $CoCO_3$.

TCC white beads are used for a support material and the pore volume is determined by water absorption measurements. The chelate solution concentration is then adjusted so that the volume of chelate solution to be absorbed by the support material contains a quantity of dissolved cobalt and nickel metal equal to 1% of the catalyst by weight.

The support is covered with a chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

EXAMPLE XIX

A catalyst containing nickel is prepared in accordance with this invention by the following procedure. An aqueous solution of the acidic nickel chelate is prepared according to Example XVII. A nickel salt of the $H_2NiY$ so produced is prepared by neutralizing one molar part of the acid nickel chelate solution with $NiCO_3$.

The chelate solution concentration is adjusted so that the volume of solution to be absorbed by the support material contains a quantity of dissolved nickel metal equal to 2% of the finished catalyst by weight. A catalyst is then prepared as in Example XVII by impregnating silica-alumina with the chelate solution, drying and calcining.

EXAMPLE XX

A nickel catalyst is prepared in accordance with the present invention by the following procedure. To two molar parts of asparagine in aqueous solution is added one molar part of nickelous hydroxide or nickelous carbonate. The solution is farmed gently at 180° F. to speed completion of the chelation reaction.

A catalyst is prepared as in Example XVII by impregnating silica-alumina with the chelate solution, drying and calcining.

EXAMPLE XXI

A catalyst containing the metals cobalt and platinum is prepared in accordance with this invention by the following procedure. An acidic platinum chelate, $H_4(PtY)Cl_2—6H_2O$, is prepared according to Example XIV. A cobalt salt of the platinum chelate is prepared by neutralizing one molar part of the acidic platinum chelate with one molar part of $CoCO_3$, in water solution.

TCC white beads are used for the support material and the pore volume is determined by water absorption measurements. The chelate solution concentration is then adjusted so that the volume of the solution to be absorbed by the support material contains a quantity of dissolved cobalt and platinum metal equal to 2% of the finished catalyst by weight.

The support is covered with a chelate solution and allowed to stand 24 hours to assure thorough impregnation. The support material is removed from the solution and kept at 250° F. until dry. It is then calcined for about four hours at 830° F.

EXAMPLE XXII

A catalyst containing the metals nickel and iron is prepared in accordance with this invention by the following procedure. An aqueous solution of acidic iron chelate is prepared according to Example VIII. A nickel salt of the ferric chelate is prepared by neutralizing two molar parts of the acidic ferric chelate with one molar part of $NiCO_3$.

TCC white beads are used for the support material and the pore volume is determined by water absorption measurements. The chelate solution concentration is then adjusted so that the volume of solution to be absorbed by the support material contains a quantity of dissolved nickel and iron metal equal to 1% of the catalyst by weight.

The support is covered with a chelate solution and allowed to stand 24 hours to assure thorough impregnation. The support material is removed from the solution and kept at 250° F. until dry. It is then calcined for two hours at 830° F., two hours at 930° F. and 12 hours at 1030° F.

EXAMPLE XXIII

Catalysts containing the alkaline earth metal salts of acidic metal chelates have been prepared in accordance with this invention by the following procedure. One molar part of ethylenediamine tetraacetic acid in an aqueous solution is added to one molar part of $CoCO_3$. The solution is warmed gently at a temperature below 212° F. to speed the chelation reaction. An aqueous solution of $H_2CoY$ is thereby produced. Aqueous solutions of the acidic chelates of iron, platinum and chromium are prepared as described in Examples 8, 14 and 15. The alkaline earth metal salts, including calcium, magnesium and barium, of these acidic chelates are prepared by neutralizing one molar part of the acidic chelates with one molar part of the alkaline earth metal carbonates or hydroxides. If different proportions of the metals are preferred, neutralizations are carried out to the desired extent.

TCC white beads are used for the support material and the pore volume is determined by water absorption measurements. The chelate solution concentrations are then adjusted so that the volume of solution to be absorbed by the support material has the desired metal content.

The support samples are covered with chelate solutions and allowed to stand 24 hours to assure thorough impregnation. The support material is removed from each solution and kept at 250° F. until dry. It is then calcined at 800–850° F. for 10 hours.

The improved method of catalyst production of the invention is capable of advantageous use in the preparation of catalysts useful in any reaction which is accelerated by the surface of a metal or a metal compound dispersed on a support. Supported catalysts for use in hydrogenation, dehydrogenation, cracking and hydrocracking, isomerization, reforming, aromatization, cyclization, oxidation, desulfurization, denitrogenation, disproportionation, and the like, are advantageously prepared pursuant to the invention and the various metal materials found catalytically active in these reactions can be more effectively disposed on the support by the method of the invention. For example, the catalysts of Examples V through XIII and XV through XXI, inclusive, exhibit a high degree of activity in the hydrocracking of heavy California gas oils. The catalyst of Example XIV is an active reforming catalyst.

I claim:

1. A catalyst comprising at least one catalytically active metal component selected from the group consisting of the metals of groups VI and VIII of the periodic table and the oxides of said metals, deposited on a porous support of surface area of at least 25 m.$^2$/g. having catalytic cracking activity, said support being selected from the group consisting of alumina and silica-alumina, said catalytically active metal component having been positioned on the support by impregnating the latter with a dispersion of a chelate of the metal and an amino acid and by thereafter drying the impregnated support and calcining the dried product so obtained to decompose the chelate.

2. The catalyst of claim 1 wherein the catalytically active component is one of a group VI metal and wherein the support is silica-alumina.

3. The catalyst of claim 1 wherein the catalytically active component is one of a group VIII metal and the support is silica-alumina.

4. A catalyst comprising platinum metal deposited on a silica-alumina support having a surface area of at least 25 m.$^2$/g., said platinum having been positioned on the support by impregnating the latter with a dispersion of a chelate of platinum and an amino acid and by thereafter drying the impregnated support and calcining the dried product so obtained to decompose the chelate.

5. The catalyst of claim 4 wherein the platinum chelate employed in forming the catalyst is free of any halide.

6. A catalyst comprising molybdenum oxide on a silica-alumina support having a surface area of at least 25 m.$^2$/g., said oxide having been positioned on the support by impregnating the latter with a dispersion of a chelate of molybdenum and an amino acid and by thereafter drying the impregnated support and calcining the dried product so obtained to decompose the chelate.

7. The catalyst of claim 6 wherein cobalt oxide is also present on the support, said cobalt having been added in the form of a chelate.

8. A catalyst comprising oxides of cobalt and chromium deposited on a silica-alumina support having a surface area of at least 25 m.$^2$/g., said oxides having been positioned on the support by impregnating the latter with a dispersion of at least one chelate of said metals and an amino acid and by thereafter drying the impregnated support and calcining the dried product so obtained to decompose the chelate.

9. A catalyst comprising oxides of nickel and chromium deposited on a silica-alumina support having a surface area of at least 25 m.$^2$/g., said oxides having been positioned on the support by impregnating the latter with a dispersion of at least one chelate of said metals and an amino acid and by thereafter drying the impregnated support and calcining the dried product so obtained to decompose the chelate.

References Cited in the file of this patent

UNITED STATES PATENTS

| | | |
|---|---|---|
| 1,914,557 | Craver | June 20, 1933 |
| 2,651,595 | Moulthrop | Sept. 8, 1953 |
| 2,659,691 | Gislon et al. | Nov. 17, 1953 |

OTHER REFERENCES

"Sequestrene," by Alrose Chemical Co. (1952), page 27.

"Versenes," Technical Bulletin No. 2 (1952), by Bersworth Chemical Co., Section II, page 60.

Martell and Calvin: "Chemistry of the Metal Chelate Compounds," New York (1952), pages 390, 469, 470 and 500–503.